(12) United States Patent
Blais

(10) Patent No.: US 8,453,375 B2
(45) Date of Patent: Jun. 4, 2013

(54) RIG FOR FISHING

(76) Inventor: Daniel Blais, Lanoraie (CA)

( * ) Notice: Subject to any disclaimer, the term of this patent is extended or adjusted under 35 U.S.C. 154(b) by 296 days.

(21) Appl. No.: 13/042,695

(22) Filed: Mar. 8, 2011

(65) Prior Publication Data

US 2012/0227311 A1    Sep. 13, 2012

(51) Int. Cl.
*A01K 91/00* (2006.01)

(52) U.S. Cl.
USPC .................. 43/43.1; 43/43.15; 43/42.74

(58) Field of Classification Search
USPC ............... 43/43.1, 43.15, 42.74, 44.84, 34, 43/4.5
See application file for complete search history.

(56) References Cited

U.S. PATENT DOCUMENTS

| | | | | |
|---|---|---|---|---|
| 1,720,287 | A * | 7/1929 | Moore | 43/44.85 |
| 3,163,954 | A | 1/1965 | Westin | |
| 3,168,789 | A | 2/1965 | Gednalske | |
| 4,285,154 | A * | 8/1981 | Grahl | 43/17 |
| 4,509,287 | A | 4/1985 | Hood | |
| 4,942,687 | A * | 7/1990 | Post | 43/17 |
| 4,989,360 | A * | 2/1991 | Lewis | 43/42.49 |
| 5,369,905 | A * | 12/1994 | DeMars | 43/42.74 |
| 5,950,348 | A * | 9/1999 | Gruel | 43/42.49 |
| 6,519,893 | B2 * | 2/2003 | Shook | 43/17 |
| 7,861,456 | B2 * | 1/2011 | Stone et al. | 43/42.74 |
| 2009/0272022 | A1 * | 11/2009 | Grega | 43/17 |

FOREIGN PATENT DOCUMENTS

GB    02335584    3/1998

* cited by examiner

*Primary Examiner* — Christopher P Ellis

(57) ABSTRACT

A rig for ice fishing has an elongated rod having two vertically spaced connection members at one end and an eyelet at an opposite distal end. A line member adapted to be vertically dropped through a hole in a portion of ice that has formed upon a body of water, the line member including an upper end portion adapted to be held by a fisherman out of and above the water and ice, and a lower end portion having a weight member attached thereto. A first connecting means attached to the line and a second connecting means attached on the line and below the first connecting means; the first and second connecting means joining so as to form an elongated rod thus biased and held substantially horizontally below the surface of the water and ice while being used. A reel member including a tensioning member attached to the elongated rod, and a fishing line member including a hook member on a distal end, wherein the fishing line member connects to a reel line and the reel line passes through an eyelet which forms the opposite end of the elongated rod and is attached and wound upon the reel member.

6 Claims, 3 Drawing Sheets

RIG FOR FISHING

FIELD OF THE INVENTION

The present invention relates generally to sports fishing but more particularly to a fishing rig optimized for ice fishing.

BACKGROUND OF THE INVENTION

Ice fishing is the activity of catching fish with lines and hooks or spears through an opening in the ice on a frozen body of water. It involves specialized equipment such as a rod which is seldom more than a fiberglass rod about two feet long with two line guides and a small take up reel. The main line can be from 2 to 6 pound test monofilament. Bobbers, lures, hooks, sinkers, swivels and other basic fishing tackle round up the ice fishing kit.

SUMMARY OF THE INVENTION

In view of the foregoing disadvantages inherent in the known devices now present in the prior art, the present invention, which will be described subsequently in greater detail, is to provide objects and advantages which are:

To provide for an ice fishing rig which does not freeze because it is located entirely under water.

To ensure a good catch by allowing the fish more leeway so that it can have a good bite down on the hook.

To attain these ends, the present invention generally comprises an elongated rod having two vertically spaced connection members at one end and an eyelet at an opposite distal end. A line member adapted to be vertically dropped through a hole in a portion of ice that has formed upon a body of water, the line member including an upper end portion adapted to be held by a fisherman out of and above the water and ice, and a lower end portion having a weight member attached thereto so that it can sink all the way to the bottom of the body of water; a first connecting means attached to the line and a second connecting means attached on the line and below the first connecting means; the first and second connecting means joining so as to form an elongated rod thus biased and held substantially horizontally below the surface of the water and ice while being used; a reel member including a tensioning member attached to the elongated rod; and a fishing line member including a hook member on a distal end, wherein the fishing line member connects to a reel line and the reel line passes through an eyelet which forms the opposite end of the of the elongated rod and is attached and wound upon the reel member.

The fishing rig has the two vertically spaced connection members of the elongated rod formed as part of a triangular flange at the end thereof.

The fishing rig has the tensioning member comprised a flat head bolt, a wing nut placed upon the bolt adapted for setting the tension, a helical spring placed upon the bolt, and a retaining ball placed between the helical spring and the reel member.

The fishing rig has the reel member and tensioning member attached to the elongated rod using a second bolt member.

The fishing rig has the weight member of the line member being a lead weight, and is adapted to create tension in the line member and thereby give stability to the elongated rod.

The fishing rig has the fishing line spooled off the reel when a fish bites before pulling on the line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
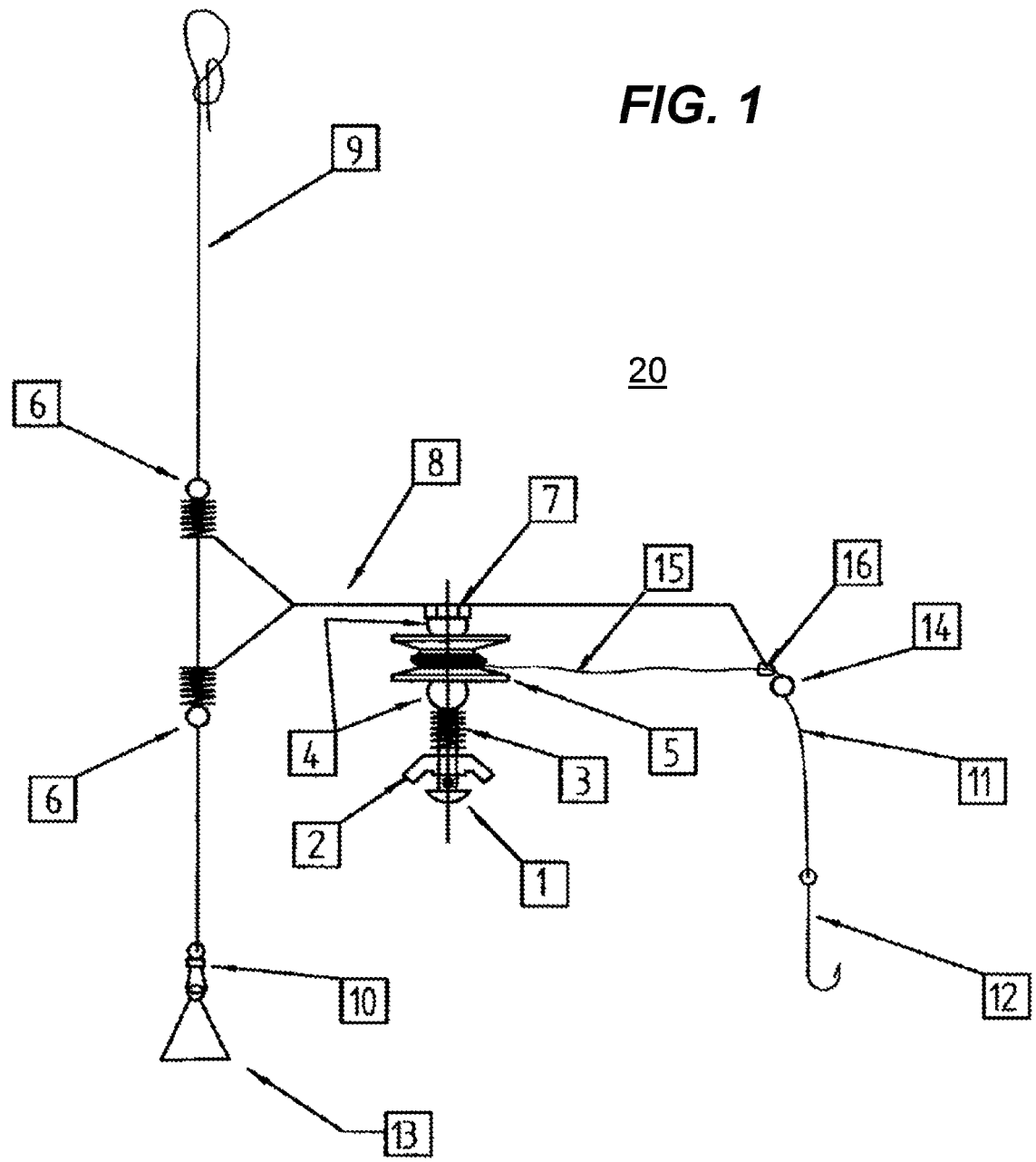
FIG. 1 Side elevational view of the invention.
Figure 2:
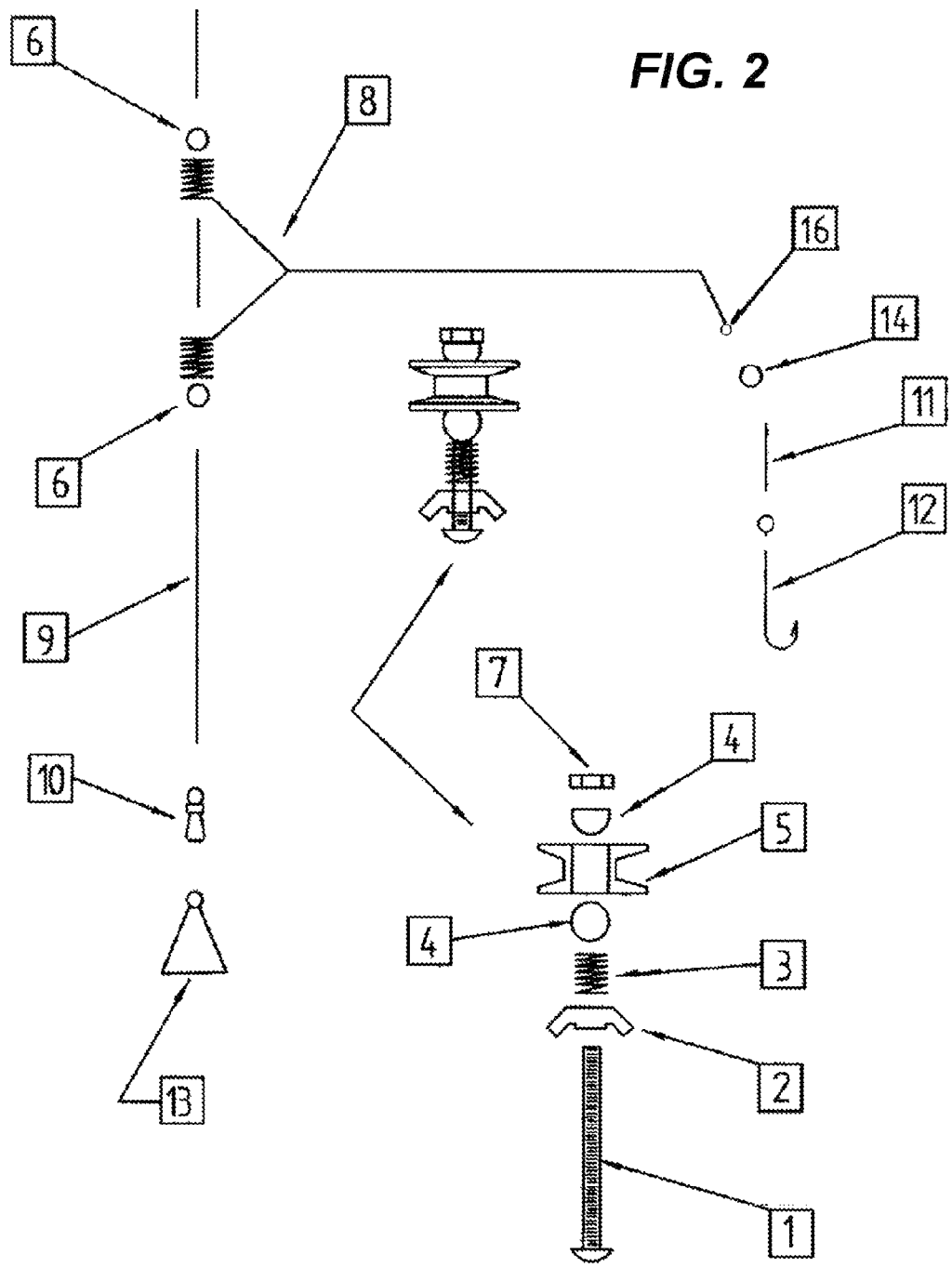
FIG. 2 Exploded view of the invention.
Figures 3A, 3B:
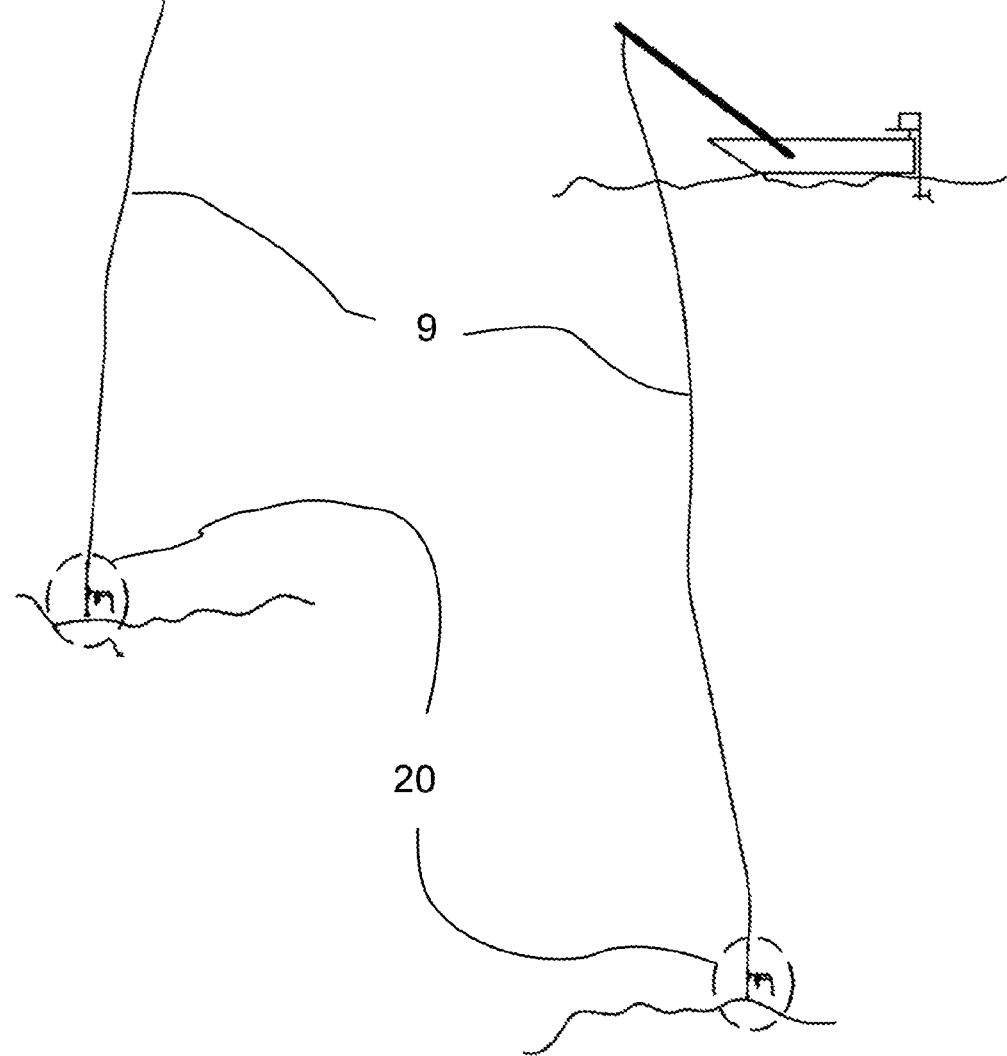
FIGS. 3a-b Schematic views of the invention in context of use for ice fishing and for boat fishing.

A fishing rig (20) consists of a flat head bolt (1); a wing nut (2) for setting the tension; a spring (3), a retaining ball (4); and a reel (5). A second bolt (7) mechanically fastens the reel (5) to an elongated rod (8). Parts (1,2,3,4) adjust the tension on the reel (5).

The elongated rod (8) has a two vertically spaced connection members (6) connecting a line (9) from a typical fishing gear of the prior art. The lower connection member being connected to a lower biasing means (6) and the upper connection member being connected to an upper biasing means (6) connecting to the line (9) and the lower biasing means connecting with a weight connector (10) which connects the line (9) with a lead weight (13). The opposite end of the rod (8) connects to a fishing line (11) by way of a fishing line connector (14) which interfaces between the fishing line (11)

and a reel line (15) spooling off of the reel (5) and passing through an eyelet (16) which extends integrally from the elongated rod (8).

All the parts are placed in the water and only the upper part of the line (9) is above water, that way, the parts do not freeze. The lead weight (13) keeps the rod horizontal. When a fish bites, a chain reaction activates from the hook (12), fishing line (11), rod (8) and onto the line (9) so that the angler (not shown) knows a fish is biting but not until the fishing line (11) has been spooled out from the reel (5) which gives a length of about two feet. Enough for the fish to chew the hook and be well hooked before pulling on the line (9).

Anything upwards of the fishing line (9) is outside of the water and is directly used by the user as is usually done for this type of fishing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A fishing rig comprising an elongated rod having two vertically spaced connection members at one end and an eyelet at an opposite distal end; a line member adapted to be vertically dropped through a hole in a portion of ice that has formed upon a body of water, said line member including an upper end portion adapted to be held by a fisherman out of and above the water and ice, and a lower end portion having a weight member attached thereto; a first connecting means attached to the line and a second connecting means attached on said line and below said first connecting means; said first and second connecting means joining so as to form said elongated rod thus biased and held substantially horizontally below the surface of said water and ice while being used; a reel member including a tensioning member attached to said elongated rod; and a fishing line member including a hook member on a distal end, wherein said fishing line member connects to a reel line and said reel line passes through an eyelet which forms the opposite end of said elongated rod and is attached and wound upon said reel member.

2. The fishing rig of claim 1, wherein said two vertically spaced connection members of said elongated rod are formed as part of a triangular flange at said end thereof.

3. The fishing rig of claim 1, wherein said tensioning member comprises a flat head bolt, a wing nut placed upon said bolt adapted for setting the tension, a helical spring placed upon said bolt, and a retaining ball placed between said helical spring and said reel member.

4. The fishing rig of claim 1, wherein said reel member and tensioning member are attached to said elongated rod using a second bolt member.

5. The fishing rig of claim 1, wherein said weight member of said line member is a lead weight, and is adapted to create tension in said line member and thereby give stability to said elongated rod.

6. The fishing rig of claim 1, wherein said fishing line is spooled off said reel when a fish bites before pulling on said line.

* * * * *